United States Patent Office 3,664,844
Patented May 23, 1972

3,664,844
EDIBLE COLLAGEN FILM
Albert T. Miller, Somerville, N.J., assignor to Devro, Inc.
No Drawing. Filed Feb. 10, 1970, Ser. No. 10,305
Int. Cl. A23j *1/10;* A22c *13/00*
U.S. Cl. 99—18                                23 Claims

ABSTRACT OF THE DISCLOSURE

Edible collagen continuous films, which are strong and have good wet strength, which are especially useful when used to hold and cover wet meat emulsions to make meat bar snack products, are prepared by forming and drying a sheet of acid-swollen hide corium-derived collagen treated with fungal proteases derived from *Aspergillus oryzae* and *Aspergillus flavus-oryzae*, which also contains a plasticizer and preferably further contains a solubilized soy protein and/or an edible cellulose, and then preferably treating the dried film with gaseous ammonia when greatly enhanced wet strength is desired.

SUMMARY OF THE INVENTION

The present invention relates to novel types of edible collagen films and the processes by which they are made, and is more particularly concerned with an edible film of collagen that has been treated with fungal protease enzymes derived from *Aspergillus oryzae* or *Aspergillus flavus-oryzae*, which film will not dissolve in water but has excellent wet strength, good dry tensile strength, is relatively heat-resistant, is produced as a continuum, and has the many other characteristics necessary to permit its successful use in packaging meat snack bars, toaster-pack foods, and like products.

Such films are prepared by forming an aqueous slurry of collagen from the corium layer of hides which is finely divided and comminuted, a fungal protease derived from *Aspergillus oryzae* or *Aspergillus flavus-oryzae*, a plasticizer and an edible nontoxic acid, allowing the resultant swollen dispersion mixture to incubate until it has the flow rate necessary to permit its extrusion in continuous sheet form onto a casting surface where it becomes a film as it dries.

It is especially preferred to treat the dried film with gaseous ammonia, since this greatly increases the wet strength. It is also preferred to include edible cellulose in the film to enhance its drying properties, and to include solubilized soy protein in the film to enhance its adhesion properties when used with wet meat emulsions to make meat snack bars.

BACKGROUND AND UTILITY OF THE INVENTION

There has long been a need for an edible collagen film which possesses good wet strength when contacted with meat emulsions or other moist food components. This film should be available in sheet form, have considerable dry tensile strength, and be somewhat resistant to heat during use. Such properties as smoke permeability, gas impermeability, and fat or oil resistance are also requirements for many contemplated end use applications.

One of the immediate applications for such edible collagen films is in meat bar snack products, such as those disclosed and claimed in Robert F. Autry's copending U.S. application Ser. No. 10,304, filed Feb. 10, 1970, entitled "Production of Meat Snack Product" and assigned to the same assignee as this application, wherein a meat emulsion in sheet form is placed between two sheets of the edible collagen film of the instant application to form a laminate, which is then dried, and thereafter handled much as a candy bar would be (in terms of shape and packaging), resulting in a meat product having excellent shelf life, which can be manufactured by methods lending themselves to high speed mechanical operations requiring a minimum of hand labor.

The properties necessary for films useful for such applications are: they need to have good wet strength so they can support the wet meat emulsions, be permeable to water vapor so that the meat emulsion can be dried through the film, be resistant to temperatures of 160–170° F. (71–77° C.) during use, be permeable to smoke and be a good barrier against oxidation and fat migration to prevent rancidity and to keep the fat from coming to the surface. Sufficient dry tensile strength is required to allow handling of the film in a commercial meat rolling and film coating process, otherwise the film would tear easily and could not be handled in large roll form. The edible collagen films of the present invention have these properties and are useful for the above purposes.

It is well-known that collagen found in the corium layer of animal skins can be converted by mechanical disintegration and by the swelling action of acids into a plastic mass or gel or dispersion, which usually is extruded in a tubular shape and treated in various ways to become the familiar collagen casings used for sausages; and it is also known that the plastic mass, gel, or dispersion, instead of being extruded in tubular shape, can be cast and dried to form a transparent film. These dispersions, however, are necessarily of very low solids content because of their high instrinic viscosities. Thus, in order to obtain dry films of any workable thickness, a very tedious process of repetitively casting and drying layer upon layer of wet film is required. Thus the acid-swollen collagen dispersions of the type used to make casings, which usually have a solids content of about 3.5 percent collagen, are not practical to make the continuous strong films of the present invention.

Another type of continuous edible collagen films is also known, but they lack the properties required here. For example, in the copending application of Toshio Tsuzuki, Ser. No. 782,953, filed Dec. 11, 1968, entitled "Edible Water Soluble Collagen Film," which issued as U.S. 3,529,530 are described films which were prepared from an enzyme modified collagen (using the plant proteases ficin, bromelin or papain as the enzyme) and which are used to make hot water soluble pouches. They are completely unacceptable for use in the instant invention because of very poor moisture resistance and resulting poor wet strength. Even at cold water temperatures those water-soluble films readily soften and disintegrate.

In order to make the film of the present invention, a way had to be found to make a dispersion which would have sufficient solids content so it could be laid down as a continuous film and yet have a low enough viscosity to be workable and capable of being extruded. Most proteolytic enzymes are, to some extent, capable of breaking down the high molecular structure of collagen to reduce the apparent viscosity. Unfortunately, a corresponding increase in soluble collagen is usually associated with this decrease in gel viscosity so the resulting films cast from these prior art dispersions generally have poor wet strength.

GENERAL DESCRIPTION OF THE INVENTION

It has now been discovered that collagen films having good wet strength can be made from high solids gels or dispersions of acid-swollen collagen, which has been treated with certain fungal protease enzymes—namely, those derived from *Aspergillus oryzae* or *Aspergillus flavus-oryzae*, forming films which are subsequently air dried. It has been further discovered that the wet strength of the resultant film of the present invention is greatly enhanced if the dried film is then exposed to gaseous ammonia vapors.

The collagen used to make the edible collagen film of the present invention may be conveniently obtained from any source of hide collagen, but especially from the corium layer of hides. The hides used may be fresh hides, limed hides or hides which have had lime added and which were then unlimed. Various methods of treating hides to obtain the collagen in proper form for use here are well-known.

The proteolytic enzymes which are used to modify the collagen to make the films of the present invention are fungal proteases derived from *Aspergillus oryzae* or *Aspergillus flavus-oryzae*. A number of such proteases are commercially available from Rohm and Haas under the trademarks Rhozyme 41, Rhozyme P-11, Rhozyme J-25, and Rhozyme A-4. Rhozyme P-11 is derived from *Aspergillus flavus-oryzae*, while the others are derived from *Aspergillus oryzae*. To satisfy U.S. Department of Agriculture regulations, only food grade enzymes may be used to make edible products. There are other Rhozymes available from Rohm and Haas of industrial grade, which would be operative also for purposes of the present invention.

The various commercially-available fungal proteases derived from *Aspergillus oryzae* and *flavus-oryzae* differ in their specific proteolytic activities. Thus varying amounts are required in the process of the present invention, depending upon which specific protease is actually used. A convenient guide for the relative activities, for purposes of the present invention, is based on the Casein Solubilization Unit.

The Casein Solubilization Unit is defined as: An enzyme with an activity of 1,000 Casein Solubilization Units per gram will solubilize nine times its weight of casein in one hour at 40° C. and a pH of about 8.

The relative activity of standardized *Aspergillus oryzae* and *flavus-oryzae* products available is listed by Rohm and Haas as:

| Material | Casein Solubilization Units | Activity factor (concentrate) |
| --- | --- | --- |
| Rhozyme A-4 | 2,000 | 4.31 |
| Rhozyme J-25 | 2,250 | 3.56 |
| Rhozyme P-11 | 10,000 | 5.38 |
| Rhozyme 41 | 7,500 | 3.25 |

The Rhozymes are also sold in the form of concentrates (the form in which they were actually used in preparing the examples of this application), which lack the diluents used in the standardized products, and consequently are much more active. The activity factors for the concentrates are as listed above. Specific activity factors will vary somewhat from lot to lot of the commercial concentrates, as may be seen from the labels accompanying the concentrates.

Because the Casein Solubilization activities of Rhozymes A-4 and J-25 are much less than for Rhozymes P-11 and 41, larger amounts must be used. It appears that a minimum of roughly 12,000 Casein Solubilization Units of protease per 100 grams of starting collagen (measured as dry solids) is required in order to obtain suitable gel flow rates in the dispersion which is to be extruded. Thus the amounts of Rhozymes J-25 and A-4 needed are roughly some three times greater than for Rhozymes P-11 and 41, making the latter two the preferred ones for use.

The amount of protease or enzyme employed is dependent upon the specific protease used, the pH and temperature of the collagen dispersion, the incubation time involved, and the hide solids content of the dispersion. These factors are adjusted to produce satisfactory results with the particular protease used. The exact amount of the protease used can vary widely but preferably ranges between about 0.05 and 1.0 part by weight for the P-11 and 41 and is about 2.5 parts by weight for the J-25 and A-4, which are used to treat 100 parts by weight of collagen (calculated as dry hide solids).

A plasticizer must also be present, else the resultant film will be brittle and unusable for the intended purposes. Various plasticizers are well-known for use with collagen. Thus plasticizer materials such as glycerin, sorbitol, sucrose, propylene glycol, corn syrup and the like are added to the protease-modified collagen in amounts which can vary widely but normally range from about 20 to 50 percent of the collagen solids. Above this amount, blocking will occur in preparing a cast collagen film, and below this amount, the resultant film will not handle well on commercial equipment.

Films of the enzyme-modified collagen can be prepared by grinding and comminuting an aqueous slurry of hide corium together with a protease and then acidifying the mixture in the known manner with an edible, nontoxic acid such as citric acid, lactic acid, hydrochloric acid, etc. The protease may be added together with the acid, if desired. Also the plasticizer may be added at any convenient point.

The resultant acid-swollen collagen gel or dispersion is incubated at temperatures which can vary, but are preferably between about 20° and 35° C., for periods between about 12–48 hours and preferably mostly at 30° C. for about 24 hours. It is then homogized and deaerated before the film is formed from it.

There are a number of optional ingredients which may be added as a part of the swollen collagen dispersion.

A preservative such as sodium benzoate, sodium propionate, sodium sorbate, and the like types of known antimicrobial agents used with foods may also be added to the acid-swollen collagen dispersions. While the amount of preservative used can vary, a suitable range is from 0.1–0.3 percent by weight, based on the dry corium collagen solids.

Edible cellulose is another optional ingredient which may be added to the above acid-collagen slurry. A typical edible cellulose is the food grade cellulose "Cellufloc" manufactured by Georgia-Pacific Company. This may be used in noncritical amounts, preferably ranging from about 6 percent to about 20 percent by weight of the starting collagen, with about 13 percent being especially preferred. The optional use of cellulose results in a superior film which allows a faster drying rate.

Soy protein is another optional preferred ingredient. The enzyme solubilized modified soy protein manufactured by Gunther Products, Inc. is typical of soy protein materials which are unexpectedly useful for improving adhesion of the film to meat emulsions. These can be used within a wide range, with amounts of 1 to 10 percent by weight of the starting dry collagen being preferred, and about 6 percent being especially preferred.

Other optional ingredients for the film such as starch, vegetable gum, vegetable cooking oil, gelatin, flavoring agents, etc. also may be added as part of the acid-swollen protease-modified collagen dispersion, if desired.

The edible film of the present invention is prepared from the foregoing dispersions. While other methods of forming a film may also be usable, the most suitable method for use with the acid-swollen collagen dispersion described is to extrude the dispersion continuously through a slit die extruder onto a moving casting belt. A belt formed of Mylar polyester is quite useful. The resultant formed sheet of dispersion is dried at temperatures which preferably are not in excess of 71–77° C. This is done by having the moving belt pass through an enclosed hot air chamber or drier. At this point the dried film has a desired moisture content of 8–10 percent by weight moisture. The film is usable in this state.

An especially preferred added step is that after the film is dried, it is then passed through a chamber of ammonia vapor which partially neutralizes the acidity of the film and which imparts improved wet strength to the final film product.

A preferred method for treating the dried film with ammonia is to have the ammonia gas contact the film while it is being rolled up in a roll, so that the ammonia gas is actually trapped between the film layers of the roll.

The dimensions of the film depend on the type and dimensions of the extruder die used and on the properties of the acid-swollen collagen dispersion extruded. Films less than about 0.75 mil would tear easily and be difficult to release and wind in a continuous manner, and those thicker than 2.0 mils would be hard to dry evenly and to handle. One mil is a very useful thickness. It is formed from a dispersion of 8 percent solids content cast as a sheet which is initially about 8.0 mils thick before it begins to dehydrate and form the film. A six-inch wide film is quite useful, but much wider sizes also are possible.

MORE DETAILED DESCRIPTION OF THE INVENTION

1(a) Dispersion preparation

The gel or dispersion used in the extrusion step is prepared by comminuting the corium layer of beef hide in the presence of water and enzyme (a useful amount is 0.5–1.0 percent based on dry corium substance). This mixture is then blended with a mixture of water, glycerin and citric acid. Food grade cellulose is included in the blend when preparing cellulose-containing films. The final blended gel is held at 30° C. for 24 hours prior to homogenization at 2,000–3,000 p.s.i. and deaeration.

It will be appreciated that the film of the present invention should be cast as a continuum or a single continuous film. The concentrations of the various ingredients used to make the gel or dispersion can vary somewhat so long as the resultant dispersion has the necessary characteristics needed. This can be seen from considering various physical and chemical characteristics such as the amount of soluble collagen present (which must not be too high, else the resultant film would be water-soluble and not have good wet strength), the gel flow rate (which must allow the dispersions to be extruded uniformly and continuously from the extruder), and the solids content (which must be high enough so that the film will be continuous and of usable thickness).

These physical and chemical characteristics of the gel dispersion and the film itself are measured by the following tests and definitions:

(A) Soluble Collagen: Soluble collagen is defined in this specification as that fraction of collagen obtained by extraction of 1 gram of freeze-dried sample using 100 ml. of 0.05 M citrate buffer (pH 3.5) at 0° C. followed by centrifuging at 48,000 G's at 0–5° C. A suitable aliquot of the supernatant is used for hydroxyproline determination according to the method of Woessner, published in Archives of Biochem. and Biophysics 93, pp. 440–447, 1961 in a paper entitled, "The Determination of Hydroxyproline in Tissue and Protein Samples Containing Small Proportions of the Imino Acid." The results are expressed as the percent soluble collagen of the total collagen.

Total collagen is determined by digesting a 100 g. sample with 6 N HCl, removing an aliquot of the sample and hydrolyzing at 138° C. for 2½ hours in a sealed ampoule. The sample is then neutralized with 6 N NaOH and a diluted portion removed for hydroxyproline determination.

(B) Flow Rate (which is an indication of gel or dispersion viscosity and extrudability): Flow rate is defined as that volume of gel in grams which can be forced through a 1.5-inch length of 0.089-inch diameter stainless steel tube under a presure of 30 pounds per square inch and a temperature of 30° C. in one minute. The values of flow rate expressed in this specification were determined using a Castor-Severs capillary extrusion rheometer, and are expressed in terms of grams per minute.

(C) Wet Burst Strength (which is a measure of the wet strength of the film): Wet burst strength is defined as the ability of a film sample to support a 25 ml. column of distilled water at 30° C. and is measured by ascertaining the time interval before a film sample fails to support a 25 ml. column of distilled water at 30° C. The test is performed on a film sample which is supported between two circular plates to expose a 9.6 square centimeter area of unsupported film. The first indications of film separation or failure to retain the water is considered the Burst Point. These results are reported as time in minutes.

(D) Dry Burst Strength: Dry burst strength is the air pressure in pounds per square inch to burst a dry film sample which has been maintained in a 70 percent relative humidity for at least 24 hours prior to testing. The values of "Burst Strength" expressed in this specification were determined on a Perkins Mullen Tester (Model C), according to the procedure of ASTM-D-2529.

(E) Dry Tensile Strength: The tensile strength at break determined on a film sample using an Instron Tensile Tester according to the procedure of ASTM D–882–64T, Method A. The initial grip separation is 5 inches and the rate of grip separation is 0.5 inch per minute. The results are reported as pounds per square inch.

(F) Elongation: The percent elongation at break is determined on a film sample using an Instron Tensile Tester according to the procedure of ASTM D–882–64T, Method A. The percent elongation is calculated by dividing the elongation at the moment of rupture of the specimen by the initial gage length of the specimen times 100.

1(b) Experimental dispersions

Gels or dispersions were prepared to contain 6 percent collagen solids, 0.36 percent citric acid and 1.8 percent glycerin. Enzyme concentrations of 0.10, 0.25, and 0.50 and 1.0 percent (percent on collagen solids) were prepared for the various fungal protease systems. The resultant dispersions or gels were incubated at 30° C. for 24 hours, and their viscosity determined by measuring flow rate. Gel samples were treated with hydrogen peroxide to inactivate the enzyme, freeze-dried, and prepared for soluble collagen analysis.

Evaluation of these samples for gel flow and extrudability indicated that those gels having flow rates, after homogenization, in excess of about 45 grams per minute are satisfactory for continuous film casting. Dispersions or gels with flow rates much below this value were generally too viscous to extrude at the 6 percent solids level. In addition, the dispersion was often non-uniform and difficult to deaerate. The specific flow rates usable will vary somewhat as the solids content is increased or decreased within the operative range.

It was found that gels prepared with various Rhozymes had excellent flow rates and low viscosities but not excessively high conversions to the soluble collagen form. Films cast from these gels had considerable wet strength when contacted with wet meat emulsions. Dry tensile strengths of these films were generally in excess of 9,000 p.s.i.

Similar gels were prepared using other enzymes, e.g. Proctase (a proteolytic enzyme derived from *Aspergillus niger*) and ficin. The comparative results shown in the following chart show why only the use of fungal proteases derived from *Aspergillus oryzae* or *flavus-oryzae* result in successful dispersions needed to make the film (which requires both a high flow rate [which is the same as a low viscosity, permitting the gel or dispersion to be easily extruded] and a relatively low level of soluble collagen [since solubility is not a desired characteristic]).

| Enzyme treatment (percent of collagen solids) | Gel flow rate (grams/min.) | Soluble collagen (percent of total) |
|---|---|---|
| 1.0% Rhozyme-41 | 64.0 | 35.0 |
| 1.0% Proctase | 25.2 | 10.8 |
| 0.3% Ficin [1] | 57.5 | 67.5 |

[1] 10% hide solids.

Although proctase gel analysis showed relatively low levels of soluble collagen, gel flow rates were generally less than 25 g./min., which was much too viscous to be extruded. Ficin gels showed both high flow rates and high soluble collagen contents, indicating severe degradation of the collagen molecule resulting in a soluble film which would not have any appreciable wet burst strength. Analysis of gels or dispersions prepared using a variety of other test enzymes showed either poor flow rates (Prolase, HT-Proteolytic bacterial protease, bromelin) or high soluble collagen contents (papain), which demonstrate their unsuitability for the purposes of the present invention.

The Prolase referred to above is Prolase MT-7820, manufactured by Wallerstein Company of Morton Grove, Ill. It was derived from *Aspergillus oryzae* but has a very low casein solubilization activity, on the order of 500–1,000 units. This is far below the 12,000 Casein Solubilization Units needed for successful operation herein. If used in sufficiently greater amounts, Prolase would be operative for purposes of the present invention, but it is certainly a less preferred form of the usable fungal proteases.

Gel acidity was found to be another important factor in altering gel viscosity. As pH is increased from 3.5, higher gel flow rates occur due to reduced swelling and resulting lower gel viscosity. At pH's above 4.8, however, only partial gelation occurs resulting in the presence of unswollen particles. Above pH 5.1 little swelling occurs and uniform extrusions are not possible. The best conditions were obtained using 2.75 percent citric acid on hide solids (pH 4.7). The effect of pH can be seen from the following comparative test results:

| Percent acid on hide solids | pH | Gel flow rate (g./min.) |
|---|---|---|
| 0.5 (unswollen) | 5.39 | 128 |
| 2.0 (partial gel) | 4.92 | 54 |
| 4.0 (swollen) | 4.42 | 21.5 |
| 6.0 | 4.13 | 11.0 |
| 8.0 | 3.88 | 4.5 |

With proper enzyme treatment, dispersions containing up to 10 percent hide solids have been prepared and successfully extruded. In a test where the hide solids contents were varied, the amount of enzyme used was always 1 percent Rhozyme P-11 (based on the starting hide solids used), the amount of acid used was 2.75 percent citric acid, the results were:

Hide solids (percent):    Gel flow rate (g./min.)
  6.0 ------------------------------------------- 64.4
  7.5 ------------------------------------------- 52.5
  8.0 ------------------------------------------- 45.0

All of the above gels were satisfactory for extrusion purposes.

2. The actual film making process

Continuous casting and drying of films is accomplished using the slit die extrusion method and a Mylar casting belt. Rhozyme P-11 or Rhozyme 41 treated gels containing 8 percent hide solids are cast at an 8–9 mil wet film thickness. This film satisfactorily dries to a 1 mil dry product (approximately 90 percent solids).

The dry film retains the approximate acidity of the gel or dispersion from which it is made. Treatment of the dry acidic film with gaseous ammonia unexpectedly has been found to result in a dramatic increase in the water resistance of the film. The partially neutralized film, which has a pH above about pH 5.0, apparently becomes bonded or chemically altered, although the exact mechanism is not yet known. Numerous continuous runs have confirmed the reality of the initial findings.

Attempts to treat the more soluble films prepared with the plant proteases ficin and papain in the same manner resulted in no improvement in film wet burst strength. This was confirmed with additional experiments despite the fact that almost complete neutralization of the film had occurred.

The comparative test results are as follows:

| | Untreated film | | Ammonia treated | |
|---|---|---|---|---|
| Enzyme treatment | pH | Wet strength [1] | pH | Wet strength [1] |
| Rhozyme (1.0%) | 4.6 | 0.74 | 5.3 | 4.45 |
| Papain (0.5%) | 4.4 | 0.32 | 5.4 | 0.33 |

[1] Time factor=9.6 cm.² area supporting a 25 ml. column of water at 30° C.

To facilitate the treatment of dry film by this method, a film windup system has been encased with an ammonia treatment chamber. A further improvement in the design now results in actual entrapment of the gas between the film layers as they are wound on the roll. The trapped gas diffuses with time to the inner structure of the film resulting in a more uniform treatment, shorter treatment time, and greater film neutralization. This method results in films having further improvements in wet strength.

3. Cellulose improves drying rate of films

Dehydration of cast collagen films has been difficult because of the poor diffusion rate of moisture through the film and the inability to contact both surfaces of the film with the hot air stream. In addition, case hardening of the exposed surface hinders moisture diffusion and subsequent evaporation. Inclusion of from 0.5 to 1.0 percent Cellufloc, a food grade wood cellulose manufactured by Georgia-Pacific, in the dispersions has been found to result in cast films having markedly improved drying rates. Films prepared from a gel containing 7.5 percent hide solids and 1.0 perecnt Cellufloc were found to result in a 23 percent average increase in drying rate over films prepared from a similar gel without cellulose. A reduction in film tensile strength and film wet strength was noted although ammonia treatment of the dry film was very effective in improving the water resistance of the film. Ammonia diffusion was noticeably improved in the cellulose-containing film resulting in a shorter treatment time to achieve the same degree of neutralization.

Kitchen tests using the ammonia-treated film to prepare the meat snack product were very satisfactory. There is also some indication that improved adhesion of the film to the meat emulsion occurs when cellulose is present. Greatly increased adhesion is also obtained when soy protein is present.

EXAMPLE I

Preparation of collagen dispersion

The corium of fresh steer hides is ground in a meat grinder until it will pass a ¼-inch screen. To 1600 g. of the ground hide corium (dry hide solids) is added 11,379 g. water, 16 g. Rhozyme 41 fungal protease (Rohm & Haas), 3.2 g. sodium benzoate and 1.6 g. sodium propionate. The slurry of collagen in the aqueous solution is finely ground in a Mikro-cut grinder (A. Stephan u. Sohn, Hameon, Weser, Germany). After two passes through the Mikro-cut grinder the slurry is mixed with 7000 g. of aqueous solution containing 480 g. glycerin and 44 g. citric acid. The mixture is blended by passing it through a Butcher Boy meat grinder (Lasar Mfg. Co., Inc., Los Angeles, Calif.) fitted with a plate having ¼-inch diameter holes. A second pass is made through this grinder using a plate or head having 5/64-inch diameter holes. The swollen mixture is incubated at 32° C. for 24 hours. At the end of this 24 hour period, the dispersion or gel is homogenized under a pressure of from about 2000 to 3000 pounds per square inch and deaerated. It is then filtered through a 4-mil slotted filter screen (Ronningen-Petter Co., Kalamazoo, Mich.) to remove any unswollen particles and foreign material.

EXAMPLE II

Extrusion of collagen dispersion and formation of film

The homogenized, deaerated and filtered dispersion of Example I is metered through a metering pump which maintains a constant feed of dispersion under pressure to the extruder inlet. The extruder used is an adjustable lip, slit die extruder of the type where the inlet of the extruder is narrow, but the opening fans out progressively and is widest at the outlet. The gap clearance within the extruder also varies, being narrowest at the middle and widest at the outermost edges. Extruders of this type produce uniform delivery of dispersion along all points on the die lips. The collagen dispersion entering the extruder inlet is forced into a fan-shaped pattern as it moves through the extruder and out the die lips, where it drops at a uniform rate from the bottom of the extruder, which is positioned directly above an endless belt.

As the resulting formed sheet of dispersion leaves the extruder, it is immediately cast onto an endless belt, preferably one having a high-release surface. A suitable high-release surface for casting these dispersions is Mylar polyester film (E. I. du Pont de Nemours & Co., Inc., Wilmington, Del.). The endless casting belt is driven by drums connected to a constant drive system.

The formed sheet of dispersion is conveyed on the endless moving casting belt into a warm air drier. The drier used is one built in two sections; an upper plenum for delivery of heated air and a lower drying chamber directly below the plenum, which is the part through which the endless belt actually passes. Heated air is forced by a fan into the plenum and then caused to move through a series of slots in its base, across the surface of the dispersion moving through the drying chamber on the endless belt. Vapor laden air is removed from the drying chamber through exhaust ports by a suction fan. The warm air in the drying chamber is at 60–70° C. and the velocity of the air at the exit of the plenum is 6,000 to 10,000 feet per minute.

As the formed sheet of dispersion moves through the drying chamber and becomes partially dehydrated, it begins to take on the properties of a continuous flexible film. At the tail end of the drying chamber the dehydrated "dried" film has a moisture content of from 7 to 10 percent. At this point the film has enough strength and continuity to be released from the casting surface. "Dryness" is an important factor in the ability of the film to release from the casting surface. Nonuniformity in drying or the presence of "wet spots" in the film can cause serious problems.

The dry collagen film may be conveyed through a tension sensing device as part of a constant windup system to be wound onto a corrugated core as a roll of film ready for use.

Typical films made by the process described above are generally from 0.75 to 1.25 mils in thickness, depending on the original wet film thickness extruded from the die. Extruded, formed sheet dispersions of approximately 8.0 mil thickness and containing 7.5 to 8.0 percent hide corium solids will generally dehydrate to yield films of approximately 1.0 mil thickness. The films are clear and transparent. The dry tensile strength of the films is at least about 10,000 to 15,000 p.s.i. (Instron Tensile Tester) and the elongation about 13 to 17 percent. The dry burst strength is about 6 to 10 pounds per square inch (Perkins Mullen Tester, Model C). The wet burst strength is 0.8 to 1.8 minutes. The soluble collagen content is 23 to 36 percent of the total collagen.

The film of this Example II is about 1 mil in thickness and has the following physical properties:

| | |
|---|---|
| Dry Tensile Strength (pounds) | 11,264 |
| Percent Elongation | 13.6 |
| Dry Burst Strength (pounds) | 6.68 |
| Wet Burst Strength (minutes) | 0.80 |

EXAMPLE III

Treatment of dry film with ammonia

This example illustrates the effect of treating the dry film with ammonia vapor. Instead of winding the dry film onto a roll as soon as it leaves the drying chamber, the dry film is wound on roll inside of an ammonia chamber. Thus, the extruded sheet of dispersion of Example II was conveyed through the drying chamber on the endless belt, released from the endless belt casting surface and conveyed to a constant tension windup system enclosed in a sealed chamber. The sealed chamber is maintained under a slight positive pressure with gaseous ammonia vapor fed from a cylinder by means of a conduit. The conduit is branched from a T to allow direct application of ammonia gas to both surfaces of the film just prior to windup of the film on the corrugated core. A spreader on each of the branched conduits results in more uniform distribution of the vapor to the film surfaces. In this manner, excess ammonia vapor becomes entrapped between the film layers as they are wound on the core. With time, the gas will diffuse into the inner layers of film resulting in more complete reaction. The feed rate of ammonia gas to the sealed treatment chamber is 3,000 to 6,000 cc. per minute (70° F.) with the dry film being conveyed into the chamber at a rate of 3.5 to 5.0 feet per minute.

The film of this Example III is about 1 mil in thickness and has the following physical properties:

| | |
|---|---|
| Dry Tensile Strength (pounds) | 14,300 |
| Percent Elongation | 14.3 |
| Dry Burst Strength (pounds) | 6.59 |
| Wet Burst Strength (minutes) | 3.18 |

As can be seen from comparing their properties, the film of this example showed very significant improvement in moisture resistance and wet burst strength over film produced as described in Example II. When contacted with meat emulsions or other moist food components, the film retains its integrity and continuity even over extended periods of storage and can support considerable mass without disintegrating.

EXAMPLE IV

Preparation of cellulose-containing film

The corium of fresh steer hides is ground in a meat grinder until it will pass a ¼-inch screen. To 1500 g. of the ground hide corium (dry hide solids) is added 9,483.3 g. water, 11.3 g. Rhozyme P–11 concentrate (Rohm and Haas Co., Phila., Pa.), 3.4 g. sodium benzoate, and 1.7 g. sodium propionate. The slurry of collagen in aqueous solution is finely ground in a Mikro-cut grinder and mixed with 9,000 g. of aqueous solution containing 510 g. glycerin, 200 g. Cellufloc PB–33 (Georgia-Pacific refined wood cellulose), and 51 g. citric acid. The mixture is blended by passing it twice through a Butcher Boy meat grinder fitted with a plate having $\frac{5}{64}$-inch diameter holes. The swollen mixture is incubated at 30° C. for 24 hours. At the end of the incubation period the dispersion is homogenized under a pressure of 2,500 pounds per square inch and deaerated. The dispersion is filtered through a 4-mil slotted filter screen and extruded onto an endless casting belt. The formed sheet of dispersion is conveyed through the drying chamber and treated with gaseous ammonia vapor as described in Example III.

The cast dispersion of this Example IV showed a 23 percent increase in drying rate over that of Example III. This very significant improvement in drying efficiency is a direct result of the cellulose present in the film. The cellulose fibers act as "channels" in the film to allow for a more rapid diffusion of moisture out of the inner structure. The presence of the cellulose fibers helps to prevent "skinning" or case-hardening of the film surface, a phenomenon so often evident when attempting to rapidly dry collagen compositions.

The film of this example is somewhat translucent rather than transparent as in the previous examples due to the presence of the cellulose fibers. The film is about 1 mil in thickness and has the following physical properties:

Dry Tensile Strength (pounds) _____ 9,610
Percent Elongation _____ 13.6
Dry Burst Strength (pounds) _____ 6.77
Wet Burst Strength (minutes) _____ 4.21

EXAMPLE V

Preparation of soy protein film

To 1600 g. ground hide corium (dry solids) is added 10,280 g. water, 100 g. modified soy protein (Gunther D–100, Gunther Products, Inc., Galesburg, Ill.), 15.0 g. Rhozyme P–11 concentrate, 3.2 g. sodium benzoate, and 1.6 g. sodium propionate. After two passes through the Mikro-cut grinder the slurry is mixed with 8,000 g. of aqueous solution containing 480 g. glycerin and 44 g. citric acid. The mixture is blended through the meat grinder one pass using a plate having ¼-inch diameter holes, and a second pass using a plate having 5/64-inch diameter holes. The swollen mixture is incubated at 32° C. for 24 hours and then homogenized under 3,000 p.s.i. pressure. After deaeration and filtering, the dispersion is extruded onto the casting belt and conveyed to the drier.

One-half of the total quantity of the above dispersion we used to make a film which was dried and wound on a core as described in Example II without any ammonia treatment. The other half of the total quantity of the above dispersion was used to make a film which was treated with ammonia vapor as described in Example III.

The following data illustrates the dramatic improvement in wet strength noted with soy protein containing collagen films of this example treated with gaseous ammonia over similar films of this example which were not treated with ammonia.

|  | Untreated | Ammonia treated |
|---|---|---|
| pH | 5.0 | 6.5 |
| Wet burst strength | 1.52 | 20.3 |

The ammonia-treated films survived very adverse handling conditions in preparation of meat emulsion products. Similar treatment with the untreated film resulted in breakage and rupturing after contact with the wet emulsion. Nevertheless, both the untreated and ammonia-treated films of this Example V were found to possess improved moisture resistance and wet burst strength over films prepared from dispersion which did not contain modified soy protein. In addition, superior adhesion of the film to the meat emulsion was demonstrated when films of this example were used to make meat bar snack products, and compared with similar meat bar snack products made with the films of the other examples.

While this invention has been described fully and completely with special emphasis upon certain preferred embodiments, other alternatives and equivalents within the spirit of this invention will be apparent to those skilled in the art, which are intended to be included within the scope of the appended claims.

What is claimed is:

1. An extruded, edible collagen continuous film in sheet form having a wet burst strength of at least 0.80 minute, a dry tensile strength of at least 9,000 p.s.i., which is permeable to water vapor, permeable to smoke, is a good barrier against oxygen, fats and oils, and which softens slightly with heat while still remaining fairly intact at temperatures below about 160° F., said film containing a plasticizer and collagen from hide corium, which collagen was enzyme-modified by a fungal protease being used in an amount having a proteolytic activity above about 12,000 Casein Solubilization Units per 100 grams of hide corium and derived from *Aspergillus oryzae* or *Aspergillus flavus-oryzae*.

2. The film of claim 1 wherein the film also contains a solubilized soy protein.

3. The film of claim 1 wherein the film also contains edible cellulose.

4. The film of claim 1 wherein the film also contains a preservative.

5. The film of claim 1 wherein the plasticizer is glycerin.

6. The film of claim 1 wherein the film has a pH above 5.0.

7. The film of claim 1 wherein the wet burst strength is at least 3.0 minutes.

8. The film of claim 1 wherein the fungal protease is Rhozyme P–11 or Rhozyme 41.

9. The film of claim 8 wherein the film is 0.75–2.0 mils thick, has a pH above 5.0, and also contains edible cellulose and a preservative.

10. The process of preparing an edible collagen continuous film having a wet burst strength of at least 0.80 minute and a dry tensile strength of at least 9,000 p.s.i., which comprises: forming an aqueous slurry of collagen from hide corium which is in finely-divided, comminuted form, a fungal protease derived from *Aspergillus oryzae* or *Aspergillus flavus-oryzae*, said fungal protease being used in an amount having a proteolytic activity above about 12,000 Casein Solubilization Units per 100 grams of hide corium, an edible nontoxic acid, and a plasticizer; allowing the resultant swollen dispersion mixture to incubate; forming a continuous film from said dispersion; and drying said film.

11. The process of claim 10 wherein the film is formed by extruding the dispersion through a slit die extruder onto a moving casting belt.

12. The process of claim 11 wherein the dispersion is not extruded until after it has acquired a gel flow rate in excess of 45 grams per minute.

13. The process of claim 11 wherein the dried film is then treated with ammonia.

14. The process of claim 13 wherein the film is treated with gaseous ammonia while it is being rolled up so the ammonia is trapped between layers of the film.

15. The process of claim 13 wherein the wet burst strength of the film is at least 3.0 minutes.

16. The process of preparing an edible collagen film having a dry tensile strength of at least 9,000 p.s.i., which is substantially water-insoluble and has a wet burst strength of above 3.0 minutes which comprises: comminuting the collagen from the corium layer of beef hide; forming a mixture of said collagen with water, a fungal protease derived from *Aspergillus oryzae* or *Aspergillus flavus-oryzae*, said fungal protease being used in an amount having a proteolytic activity above about 12,000 Casein Solubilization Units per 100 grams of hide corium, water, a plasticizer, an edible cellulose, and an edible nontoxic acid; blending said mixture to form an acid-swollen dispersion; incubating the resultant swollen dispersion for about 12–48 hours at a temperature between about 20° C. and 35° C.; homogenizing said dispersion; deaerating said homogenized dispersion; and extruding said deaerated dispersion through a slit die extruder to form a continuous film as the extrusion dehydrates; drying said film; and treating the dried film with ammonia.

17. The process of claim 16 wherein the plasticizer is used in an amount from 20–50 percent by weight of the starting dry collagen, calculated as dry hide solids.

18. The process of claim 17 wherein the plasticizer is glycerin.

19. The process of claim 16 wherein the fungal protease used is Rhozyme P–11 or Rhozyme 41 and is used in amount from 0.05 to 1.0 percent by weight of the starting collagen, calculated as dry hide solids.

20. The process of claim 16 wherein a preservative is also used.

21. The process of claim 16 wherein the edible cellulose is present in an amount from 6 to 20 percent by weight of the starting collagen, calculated as dry hide solids.

22. The process of claim 16 wherein the film is dried at temperatures not in excess of 77° C. to a moisture content of 8–10 percent.

23. The process of claim 16 wherein the nontoxic acid is citric acid.

References Cited

UNITED STATES PATENTS

| | | | |
|---|---|---|---|
| 2,333,527 | 11/1943 | Denyes | 264—202 X |
| 2,394,309 | 2/1946 | Kajita | 264—202 |
| 3,098,696 | 7/1963 | Ball | 99—176 UX |
| 3,126,433 | 3/1964 | Cohen | 264—202 X |
| 3,314,861 | 4/1967 | Fujii | 195—6 |
| 3,529,530 | 12/1968 | Tsuzuki | 99—18 |
| 3,530,037 | 9/1970 | Nishihara | 195—6 |
| 3,535,125 | 10/1970 | Fagan | 99—176 |
| 3,071,477 | 1/1963 | Klevens | 99—175 X |
| 3,122,788 | 3/1964 | Lieberman | 264—202 X |

OTHER REFERENCES

A.P.C. application of Wolff, Ser. No. 412,393, published May 4, 1943.

FRANK W. LUTTER, Primary Examiner

R. HALPER, Assistant Examiner

U.S. Cl. X.R.

99—176; 195—6; 264—202